(12) United States Patent
Bourolleau et al.

(10) Patent No.: US 11,891,910 B2
(45) Date of Patent: Feb. 6, 2024

(54) COMPOSITE-MATERIAL CASING HAVING AN INTEGRATED STIFFENER

(71) Applicant: SAFRAN AIRCRAFT ENGINES, Paris (FR)

(72) Inventors: Clément Bourolleau, Moissy-Cramayel (FR); Serge Domingues, Moissy-Cramayel (FR); Vincent Pascal Fiore, Moissy-Cramayel (FR); Florent Louis André Rognin, Moissy-Cramayel (FR); Anwer Siraj, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 384 days.

(21) Appl. No.: 17/273,528

(22) PCT Filed: Sep. 3, 2019

(86) PCT No.: PCT/FR2019/052031
§ 371 (c)(1),
(2) Date: Mar. 4, 2021

(87) PCT Pub. No.: WO2020/049254
PCT Pub. Date: Mar. 12, 2020

(65) Prior Publication Data
US 2021/0340881 A1  Nov. 4, 2021

(30) Foreign Application Priority Data
Sep. 5, 2018 (FR) ...................................... 1857963

(51) Int. Cl.
*F01D 25/24* (2006.01)
*B29C 70/22* (2006.01)
(Continued)

(52) U.S. Cl.
CPC ............ *F01D 25/24* (2013.01); *B29C 70/222* (2013.01); *B29C 70/32* (2013.01); *B29C 70/865* (2013.01);
(Continued)

(58) Field of Classification Search
CPC combination set(s) only.
See application file for complete search history.

(56) References Cited

U.S. PATENT DOCUMENTS 8,322,971 B2     12/2012  Coupe et al.
11,491,743 B2 *  11/2022  Le Hong ................. F01D 25/24
(Continued)

FOREIGN PATENT DOCUMENTS

EP     2 791 406 A2    10/2004
EP     1 961 923 A2     8/2008
(Continued)

OTHER PUBLICATIONS

International Search Report as issued in International Patent Application No. PCT/FR2019/052031, dated Dec. 13, 2019.

*Primary Examiner* — Binh Q Tran
(74) *Attorney, Agent, or Firm* — Pillsbury Winthrop Shaw Pittman LLP

(57) ABSTRACT

A method for manufacturing a composite-material casing for a gas turbine, includes producing by three-dimensional weaving a fiber texture in the form of a strip, winding of the fiber texture around several superimposed turns on a mandrel with a profile corresponding to that of the casing to be manufactured in order to obtain a fiber preform of a shape corresponding to that of the casing to be manufactured, and densifying the fiber preform by a matrix. During the winding of the last turn of the fiber texture on the mandrel, at least one stiffening element is interposed between the before-last turn and the last turn of the fiber texture. The stiffening (Continued)

element projects over the outer surface of the before-last turn of the fiber texture. The stiffening element has an axial section of omega-type shape.

8 Claims, 9 Drawing Sheets

(51) Int. Cl.
  *B29C 70/32* (2006.01)
  *B29C 70/86* (2006.01)
  *B29L 31/00* (2006.01)
  *F01D 25/28* (2006.01)
  *F01D 25/26* (2006.01)
  *F01D 5/14* (2006.01)
  *F01D 5/28* (2006.01)

(52) U.S. Cl.
  CPC ......... *B29L 2031/7504* (2013.01); *F01D 5/14* (2013.01); *F01D 5/141* (2013.01); *F01D 5/282* (2013.01); *F01D 25/26* (2013.01); *F01D 25/28* (2013.01); *F05D 2230/21* (2013.01); *F05D 2240/14* (2013.01); *F05D 2250/75* (2013.01); *F05D 2300/6012* (2013.01); *F05D 2300/6031* (2013.01); *F05D 2300/6034* (2013.01)

(56) References Cited

U.S. PATENT DOCUMENTS

| 2008/0118683 | A1* | 5/2008 | Xie | F01D 25/005 |
| | | | | 428/34.1 |
| 2011/0052383 | A1* | 3/2011 | Lussier | F01D 21/045 |
| | | | | 156/190 |
| 2011/0182743 | A1* | 7/2011 | Naik | F01D 5/282 |
| | | | | 29/889.71 |
| 2012/0099981 | A1* | 4/2012 | Verseux | F02C 7/32 |
| | | | | 415/200 |
| 2014/0212273 | A1* | 7/2014 | Le Borgne | F02K 3/06 |
| | | | | 415/200 |
| 2015/0040396 | A1* | 2/2015 | Fremont | B29D 99/0025 |
| | | | | 29/889.71 |
| 2017/0266893 | A1 | 9/2017 | Marin et al. | |
| 2018/0135436 | A1* | 5/2018 | Berdou | D03D 25/005 |
| 2019/0226401 | A1* | 7/2019 | Heeter | C08L 77/10 |

FOREIGN PATENT DOCUMENTS

| EP | 2 290 197 A2 | 3/2011 |
| FR | 3 045 448 A1 | 6/2017 |
| FR | 3 045 456 A1 | 6/2017 |
| WO | WO 2006/136755 A2 | 12/2006 |
| WO | WO 2013/088039 A2 | 6/2013 |
| WO | WO 2016/146924 A1 | 9/2016 |

* cited by examiner

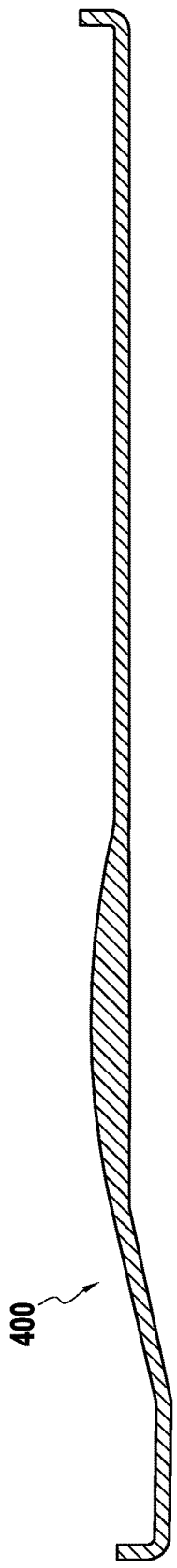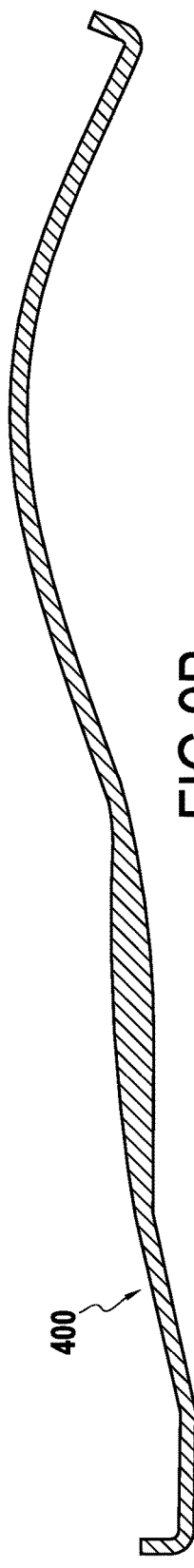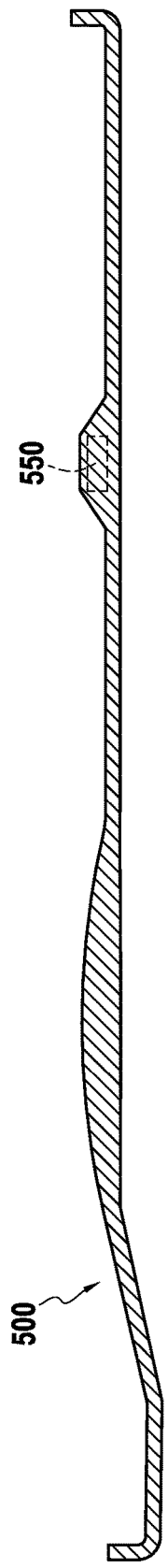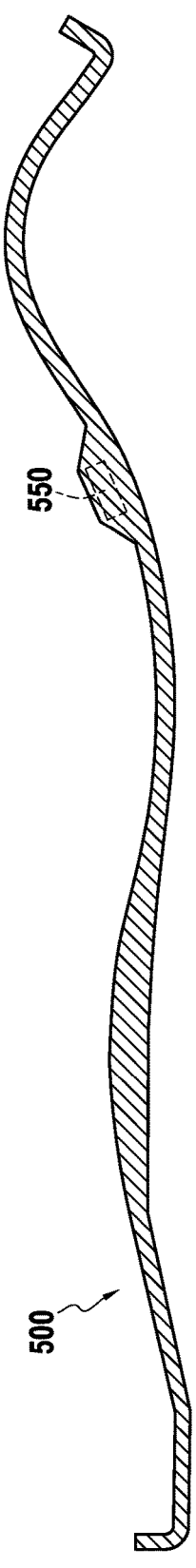

COMPOSITE-MATERIAL CASING HAVING AN INTEGRATED STIFFENER

CROSS-REFERENCE TO RELATED APPLICATIONS

This application is the U.S. National Stage of PCT/FR2019/052031, filed Sep. 3, 2019, which in turn claims priority to French patent application number 1857963 filed Sep. 5, 2018. The content of these applications are incorporated herein by reference in their entireties.

BACKGROUND OF THE INVENTION

The invention relates to gas turbine casings, and more specifically, but not exclusively, gas turbine fan casings for aeronautical engines.

The manufacturing of a composite-material casing starts with the production of a fiber texture in the form of strips, the fiber texture being made by three-dimensional weaving between a plurality of layers of warp threads and a plurality of weft threads. The fiber texture thus obtained is wound around several turns on a mold or tooling having the shape of the casing to be produced and held between the mold and segments forming a counter-mold in such a way as to obtain a fiber preform.

Once the fiber preform has been produced, i.e. after the winding of the fiber texture, the tooling bearing the fiber preform is enclosed by counter-molds then transported to an oven or furnace wherein the densification of the preform by a matrix is carried out, the matrix being notably obtainable by injection and curing of a resin in the fiber preform. The manufacturing of a fan casing made of composite material with an organic matrix is notably described in document U.S. Pat. No. 8,322,971.

In an aeronautical gas turbine engine, the fan casing fulfils several functions, a main function which is to provide the retention of debris sucked into the engine, or the blades or blade fragments projected by centrifugation, to avoid them crossing the casing and reaching other parts of the aircraft. The fan casing must also fulfil secondary functions such as in particular:
- provide mechanical continuity (efforts and moments) between the air intake scoop and the intermediate casing ring,
- allow the attachment of duct panels (acoustic panels upstream and downstream and abradable cartridge),
- connect parts of the engine to one another,
- etc.

While performing these functions, the alleviation of the overall weight of the casing is always sought, particularly by thinning certain areas thereof. However, not all the areas of the casing can be thinned as is the case, for example, of the retaining area which must be thicker in order to ensure the retention of a projectile on impact. Similarly, the upstream and downstream flanges are generally thick in order to provide the interfaces with the other parts of the engine with many take-ups of efforts.

Consequently, the structural areas located between the flanges and the retaining area of the casing are the only ones that can be thinned. However, their thinning causes a drop in the mechanical resistance of the structure of the casing which can be problematic, particularly vis a vis the dynamic behavior of the casing. Specifically, when the aeronautical engine is in operation, the fan blades create a dynamic stress (rotating pockets of pressurization-depressurization) which excites the fan casing. Consequently, the fan casing must have a minimum thickness so as not to respond to vibrational excitation that can harm the engine, as in the case for example in case of intersection with the wakes of the fan blades, the casing then entering resonance when one of its natural frequencies overlaps with an excitation harmonic produced by the blade wake, which can ruin the structure of the casing.

Solutions exist in the prior art with the aim of avoiding the appearance of unwanted modes in a composite-material casing. One solution, particularly disclosed in document WO 2016/146924, consists in equipping the composite-material casing with add-on stiffeners. However, this solution is complicated to implement, particularly as regards the attachment of the stiffeners which must be as reliable as possible.

SUBJECT AND SUMMARY OF THE INVENTION

The aim of the invention is to propose a gas turbine casing made of composite material, the stiffness of which can be increased without the drawbacks of the solutions of the prior art.

This aim is particularly achieved owing to a method for manufacturing a composite-material casing for a gas turbine, comprising:
- the production by three-dimensional weaving between a plurality of layers of warp threads and a plurality of layers of weft threads of a fiber texture in the form of a strip,
- the winding of the fiber texture around several superimposed turns on a mandrel with a profile corresponding to that of the casing to be manufactured in order to obtain a fiber preform of a shape corresponding to that of the casing to be manufactured,
- the densification of the fiber preform by a matrix, wherein, during the winding of the last turn of the fiber texture on the mandrel, at least one stiffening element being interposed between the before-last turn and the last turn of the fiber texture, the stiffening element projecting over the outer surface of the before-last turn of the fiber texture and extending over the entire circumference of said before-last turn, the stiffening element having an axial section of omega-type shape, characterized in that at least some warp threads of the plurality of layers of warp threads in the last turn of the fiber texture present at the level of an area covering said at least one stiffening element have a size or a tex less than the size or tex of the warp threads of the plurality of layers of warp threads present in the other turns of the fiber texture.

By thus interposing a stiffening element between the before-last turn and the last winding turn of the fiber texture used to form the fiber reinforcement of the casing, the composite-material casing is given a greater stiffness while simplifying and increasing the reliability of the manufacturing of the casing. Specifically, the technical solution consisting in adding one or more stiffening elements to the surface of the casing generates additional operations after the manufacturing, strictly speaking, of the composite-material casing. Furthermore, the attachment of the stiffening element or elements to the surface of the casing requires the use of attaching means, for example bonding and/or bolted joints, which can increase the overall weight of the casing and the reliability of which must be ensured to avoid detachment of the stiffening element or elements present on the casing surface. In the context of the invention, the holding of each stiffening element in position is very reliably ensured as the element is covered and retained by the last winding turn.

Furthermore, with warp threads having a lower size or tex in the last turn of the fiber texture at the level of an area covering the stiffening element, the weight of the casing is significantly alleviated at the level of the area concerned, and this is achieved without any loss of rigidity owing to the presence of the stiffening element.

According to a particular feature of the method of the invention, each stiffening element comprises two lateral walls projecting over the outer surface of the before-last turn of the fiber texture, each lateral wall forming an angle between 50° and 85° with the axis of the casing. This makes it possible to have a high degree of inertia and further increase the effect of stiffening while reducing the risk of damaging the preform.

According to another particular feature of the method of the invention, the stiffening element is produced from a cellular structure. The cellular structure is advantageous as it has a low weight while offering good resistance to compression in the radial direction of the casing.

The invention also proposes a gas turbine fan casing made of composite material with a fiber reinforcement comprising a plurality of superimposed turns of a fiber texture in the form of a strip having three-dimensional weaving between a plurality of layers of warp threads and a plurality of layers of weft threads, said fiber reinforcement being densified by a matrix, at least one stiffening element being interposed between the before-last turn and the last turn of the fiber texture, the stiffening element projecting over the outer surface of the before-last turn of the fiber texture and extending over the entire circumference of said before-last turn, the stiffening element having an axial section of omega-type shape, characterized in that at least some warp threads of the plurality of layers of warp threads in the last turn of the fiber texture present at the level of an area covering said at least one stiffening element have a size or a tex less than the size or tex of the warp threads of the plurality of layers of warp threads present in the other turns of the fiber texture.

According to a particular feature of the casing according to the invention, each stiffening element comprises two lateral walls projecting over the outer surface of the before-last turn of the fiber texture, each lateral wall forming an angle between 50° and 85° with the axis of the casing.

According to another particular feature of the casing according to the invention, the stiffening element is produced from a cellular structure Another subject of the invention is an aeronautical gas turbine engine having a fan casing according to the invention.

BRIEF DESCRIPTION OF THE DRAWINGS

Other features and advantages of the invention will become apparent from the following description of particular embodiments of the invention, given by way of non-limiting example, with reference to the appended drawings, wherein:

FIGS. 9A and 9B show a fan casing made of composite material according to the prior art, stationary and in the excited state respectively, FIGS. 10A and 10B show a fan casing made of composite material according to the invention, stationary and in the excited state respectively.

DETAILED DESCRIPTION OF EMBODIMENTS

The invention applies in general to any organic-matrix composite-material casing of a gas turbine.

The invention will be described below in the context of its application to a fan casing of an aeronautical gas turbine engine.

Figure 1:
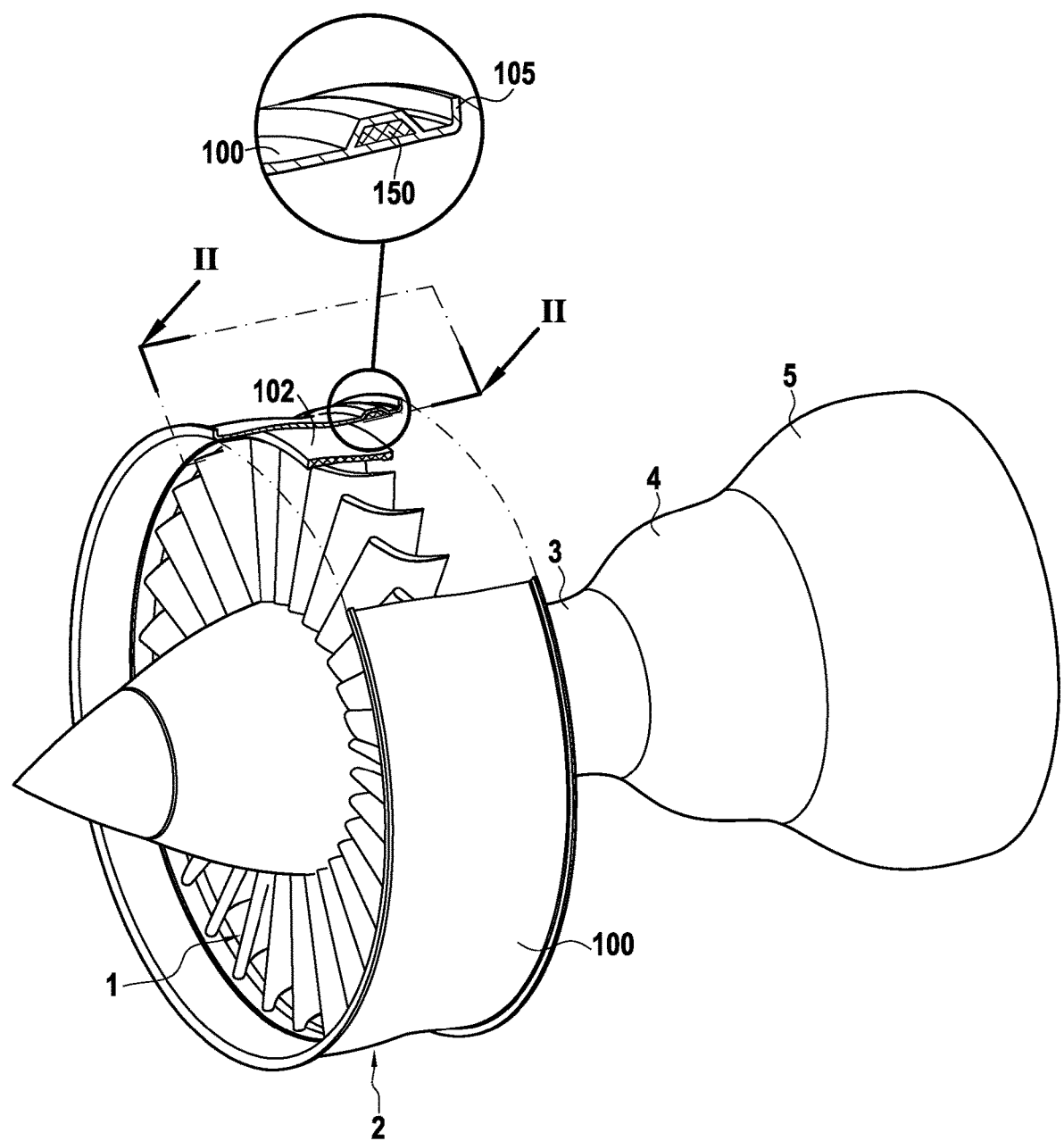
FIG. 1 is a perspective and partial section view of an aeronautical engine equipped with a fan casing made of composite material in accordance with an embodiment of the invention.

Such an engine, as shown very schematically by FIG. 1 comprises, upstream to downstream in the direction of flow of the gas flow, a fan 1 disposed at the intake of the engine, a compressor 2, a combustion chamber 3, a high-pressure turbine 4 and a low-pressure turbine 5.

The engine is housed inside a casing comprising several parts corresponding to different elements of the engine. Thus, the fan 1 is surrounded by a fan casing 100 having a revolution solid shape.

Figure 2:
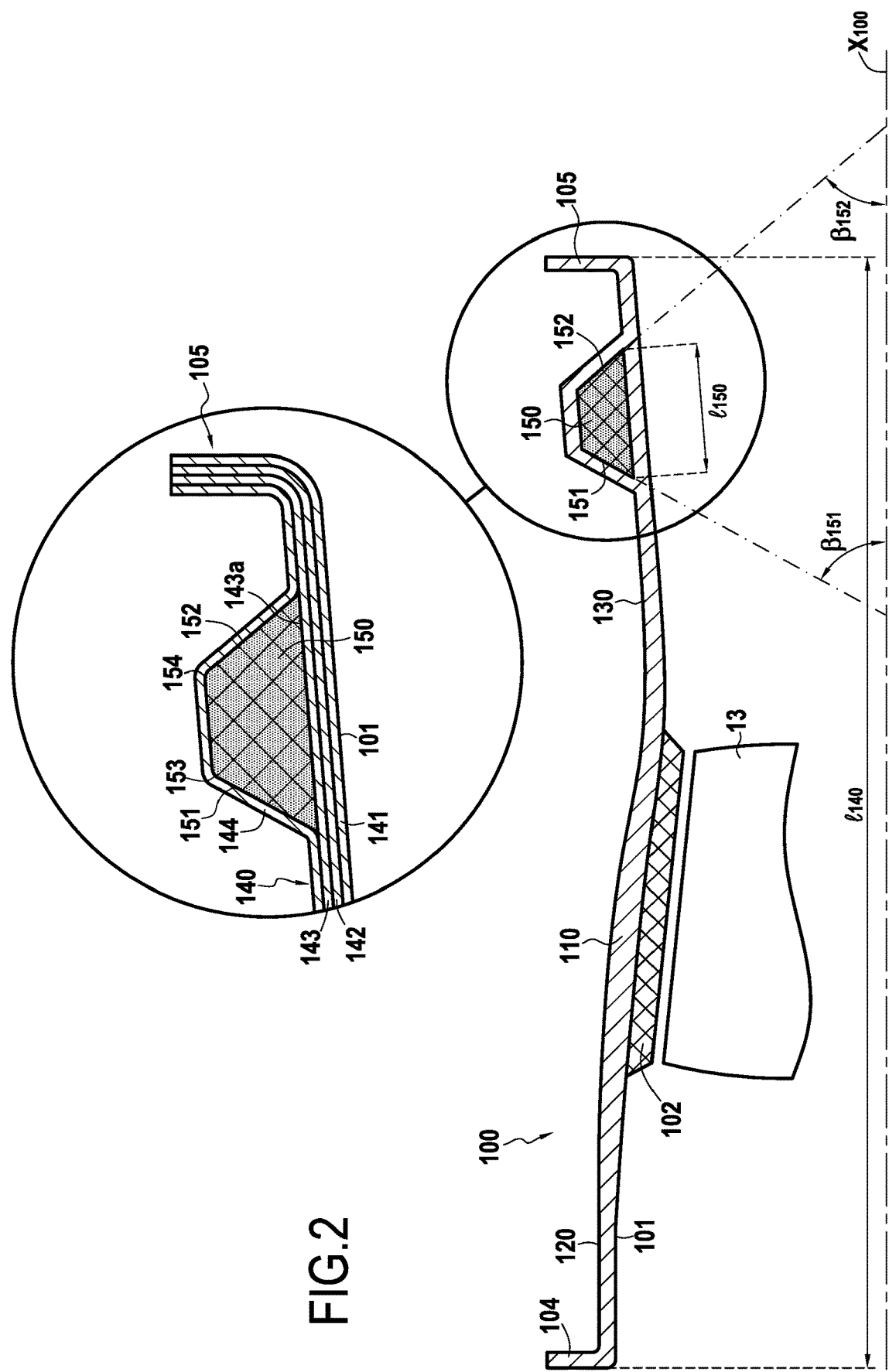
FIG. 2 is a section view along the plane II-II of the casing of FIG. 1.

FIG. 2 shows a profile of a fan casing 100 made of composite material as it can be obtained by a method according to the invention. The inner surface 101 of the casing defines the air intake path. It can be equipped with a layer of abradable coating 102 plumb with the trajectory of the fan blade tips, one blade 13 being partially shown in a very schematic manner. The abradable coating is therefore disposed on one part only of the length (in the axial direction) of the casing. An acoustic treatment coating (not shown) can furthermore be disposed on the inner surface 101 particularly upstream of the abradable coating 102.

The casing 100 can be equipped with outer flanges 104, 105 at its upstream and downstream ends in order to allow its assembly and connection to other elements. Between its upstream and downstream ends, the casing 100 has a variable thickness, an overthickness portion 110 of the casing having a greater thickness than the adjacent structural parts 120 and 130. The overthickness portion 110 extends on either side of the location of the fan, toward the upstream and downstream, to form an area where a retaining shield capable of retaining debris, particles or objects sucked into the engine intake, or resulting from damage to the fan blades, to avoid them crossing the casing and damaging other parts of the aircraft.

The casing 100 is made of composite material with a fiber reinforcement densified by a matrix. The reinforcement is made of fibers, for example carbon, glass, aramid or ceramic and the matrix is made of polymer, for example epoxide, bismaleimide or polyimide, or made of carbon or ceramic.

The fiber reinforcement is formed by winding around a mandrel a fiber texture produced by three-dimensional weaving with a variable thickness, the mandrel having a profile corresponding to that of the casing to be produced. Advantageously, the fiber reinforcement constitutes a complete tubular fiber preform of the casing 100 forming a single part with reinforcement parts corresponding to the flanges 104, 105.

In accordance with the invention, the fiber reinforcement of the casing 100 is constituted of a plurality of superimposed layers of a fiber texture in the form of a strip having three-dimensional or multi-layer weaving, each layer corresponding to one winding turn of the fiber texture. In the example described here, the fiber reinforcement of the casing 100 is composed of four superimposed layers or turns 141 to 144 of a fiber texture 140, the layers of turns 141, 142, 143 and 144 respectively corresponding to the first, second, third and fourth winding turns of the fiber texture 140 (on FIG. 2 the layers 141 to 144 are densified by a matrix).

Figure 5:
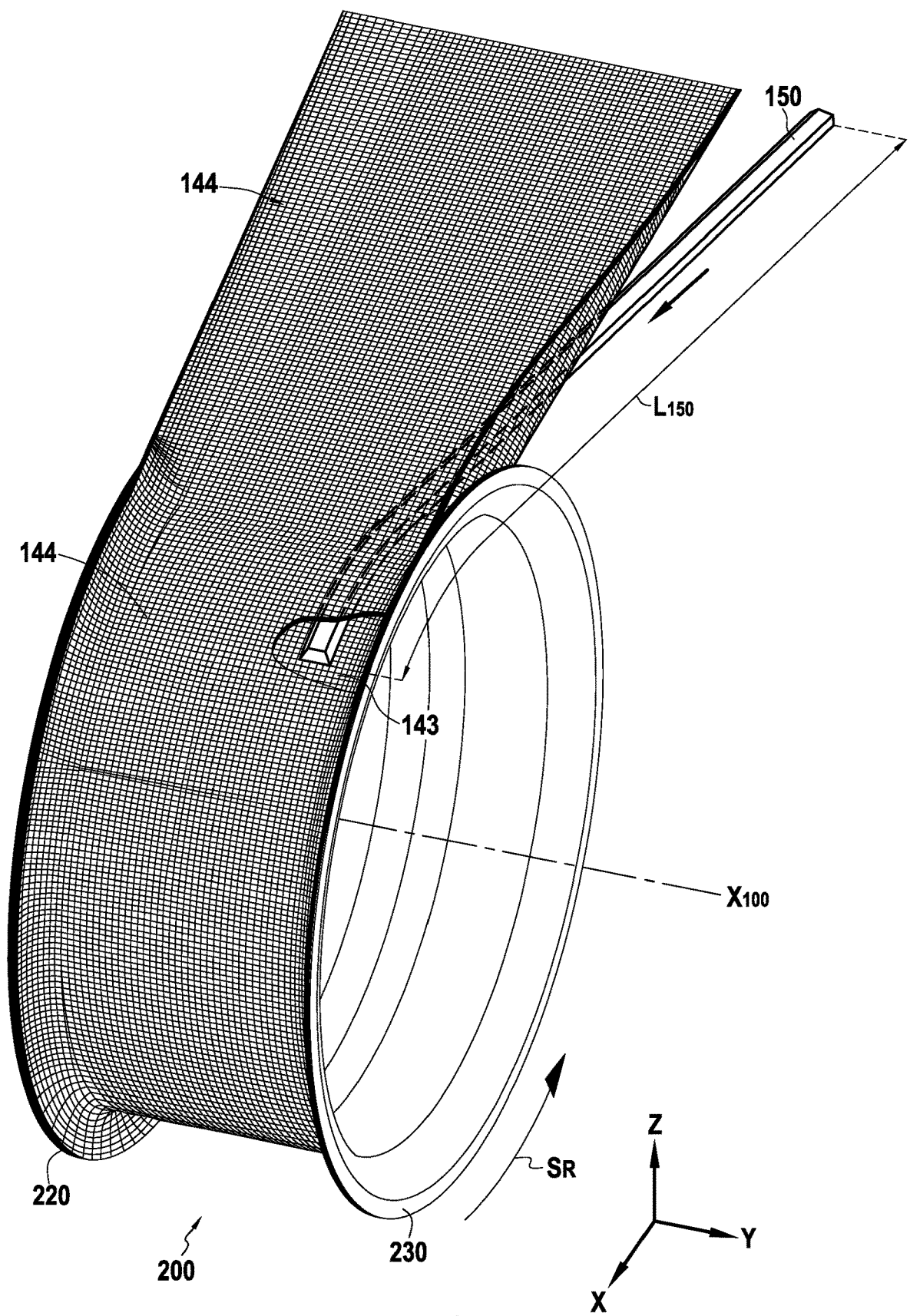
FIG. 5 is a perspective view showing the rest of the winding comprising the simultaneous winding of the fiber structure and a stiffening element of FIG. 4.

Furthermore, a stiffening element 150 is interposed between the before-last turn and the last winding turn, here between the layer 143 and the layer 144. The element 150 has a width $I_{150}$ less than the width $I_{140}$ of the fiber texture 140 and delimiting the retaining area of the casing 100. The stiffening element 150 projects over the outer surface 143a of the before-last turn corresponding to the layer 143 of the fiber texture 140, the stiffening element being covered by the fourth and last winding turn corresponding to the layer 144 of the fiber texture 140. The stiffening element 150 extends over a length $L_{150}$ corresponding to the circumference of the before-last turn of the winding, i.e. the length of the third layer 143 (FIG. 5). The stiffening element 150 has an axial section of omega or Ω-type shape. The term "omega-type" is here understood to mean any element having a section with an omega or Ω shape.

Thus, in accordance with the invention, a stiffening element is directly incorporated into the structure of the casing during its manufacturing, the stiffening element being covered by the last winding turn and, consequently, isolated from the outside environment. By thus interposing a stiffening element between the before-last turn and the last winding turn of the fiber texture used to form the fiber reinforcement of the casing, the composite-material casing is given greater stiffness while simplifying and increasing the reliability of the casing. Specifically, the technical solution consisting in added one or more stiffening elements to the surface of the casing generates additional operations after the manufacturing, strictly speaking, of the composite-material casing. Furthermore, the attachment of the stiffening element or elements to the surface of the casing requires the use of attaching means, for example bonding and/or bolted joints, which increase the overall weight of the casing, and the reliability of which must be ensured to avoid the detachment of the stiffening element or elements present on the casing surface. In the casing of the invention, the holding of each stiffening element in position is ensured very reliably as the latter is covered and retained by the last winding turn.

The stiffening element can take different forms, such as for example a continuous strip or a plurality of segments added end to end as the winding is done.

The stiffening element has an axial section in an omega-type shape. The incorporation of a separate stiffening element between layers of fiber texture makes it possible to obtain very steep slopes with respect to the axis $X_{100}$ of the casing 100. In FIG. 2, the angles $\beta_{151}$ and $\beta_{152}$ formed between the lateral walls 151 and 152 respectively of the stiffening element 150 and the axis $X_{100}$ of the casing 100 are preferably between 50° and 85°. These angles are particularly defined as a function of the stiffness that one wishes to impart to the casing and the manufacturing possibilities. In general, the dimensioning (height, width etc.) and geometry of each stiffening element are defined as a function of the stiffening needs of the casing (natural frequency).

Each stiffening element can particularly be made from a cellular structure of honeycomb core (Nida) type made of metallic or composite material (fiber reinforcement densified by a matrix), the material having to be chemically compatible with the cured resin forming the matrix of the composite material of the casing as described below. A cellular structure of honeycomb type is advantageous in that it has:
- a high degree of flexibility that allows it to be easily wound and to follow the circular shape of the casing,
- a low weight while having good resistance to compression in the radial direction of the casing,
- ease of machining,
- a relatively low procurement cost.

One such example of a composite material cellular structure that is chemically compatible with the resin of the matrix is a Nomex® honeycomb from Hexcel®.

Moreover, the stiffening element preferably has rounded edges, such as the edges 153 and 154 of the stiffening element 150, so as not to damage the fiber texture by shearing threads or strands of it for example. For this purpose, the edges or sharp angles present on each stiffening element can be machined in order to give them a rounded or soft shape.

There will now follow an explanation of a method for manufacturing a fan casing 100.

Figure 3:
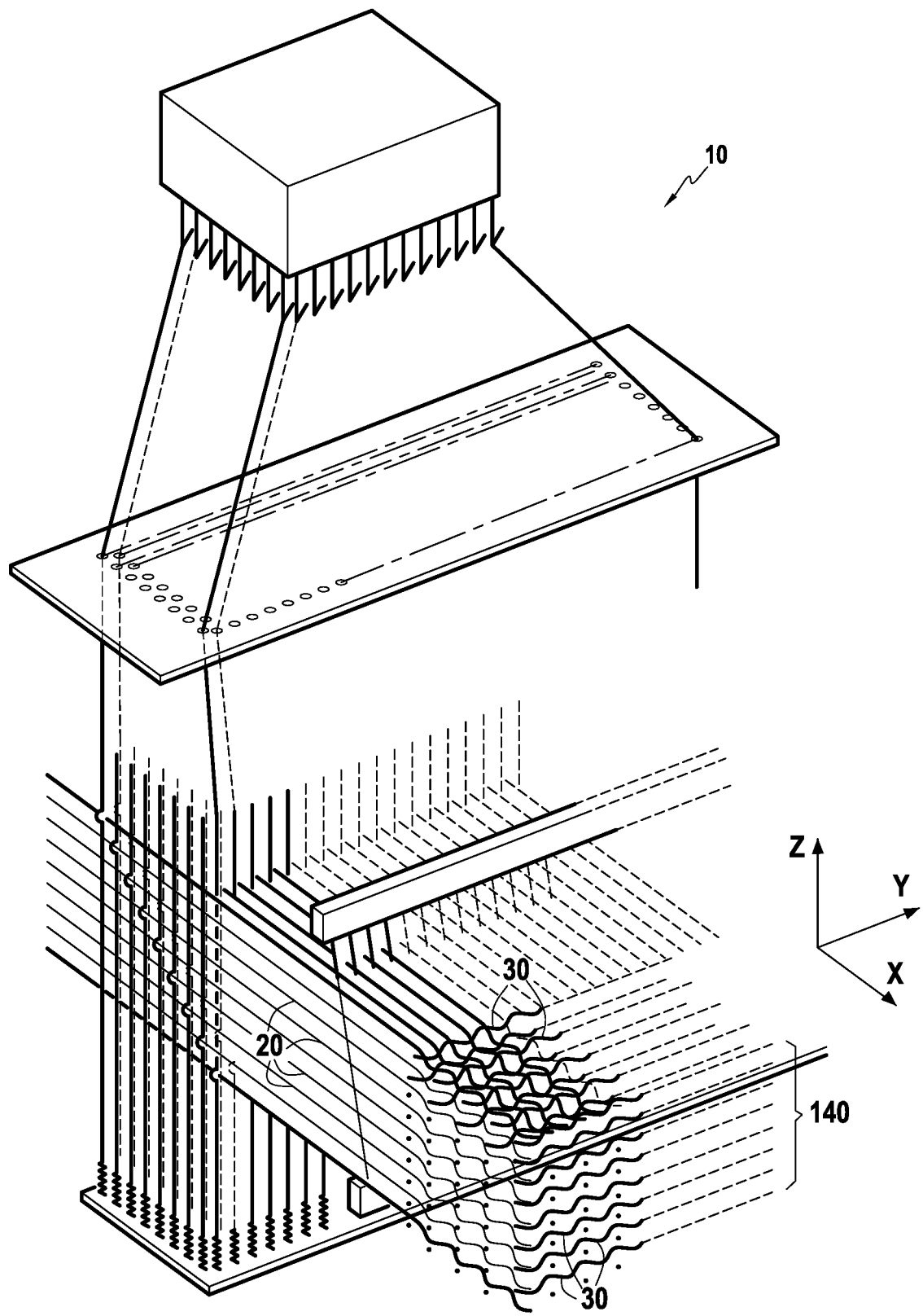
FIG. 3 is a schematic perspective view of a loom showing the weaving of a fiber texture used for the formation of the fiber reinforcement of the casing of FIGS. 1 and 2.

As shown in FIG. 3, a fiber texture 140 is produced in a known manner by weaving by means of a Jacquard-type loom 10 on which is disposed a bundle of warp threads or strands 20 in a plurality of layers, the warp threads being linked by weft threads or strands 30. The fiber texture is produced by three-dimensional weaving. The term "three-dimensional weaving" or "3D weaving" is understood to mean a mode of weaving by which at least some of the weft threads link warp threads over several layers of warp threads or conversely. An example of three-dimensional weaving is so-called "interlock" weaving. The term "interlock" refers to a weave wherein each layer of warp threads links several layers of weft threads with all the threads of one and the same warp column having the same movement in the plane of the weave. Other known types of multi-layer weaving may be used, such as in particular those described in the document WO 2006/136755.

Figure 4:
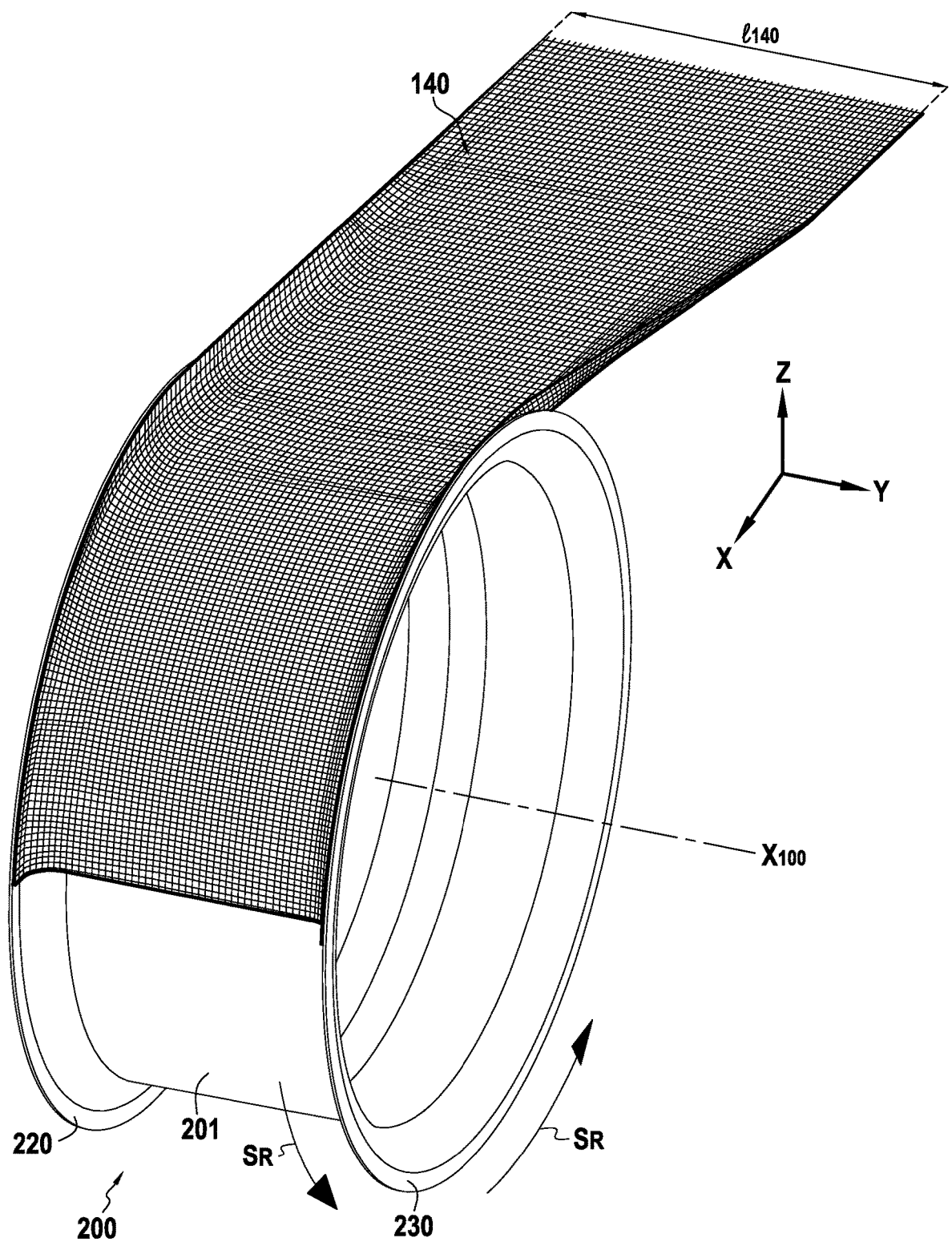
FIG. 4 is a perspective view showing the start of the winding of a fiber texture intended to form the reinforcement of the fan casing of FIGS. 1 and 2.

As illustrated in FIGS. 3 and 4, the fiber texture 140 has a strip shape extending lengthwise in a direction X corresponding to the direction of travel of the warp threads or strands 20 and widthwise or transversally in a direction Y corresponding to the direction of the weft threads or strands 30.

The fiber structure can in particular be woven from threads made of carbon fiber, ceramic such as silicon carbide, glass, or else aramid.

As illustrated in FIG. 4, a fiber preform is formed by winding on a mandrel 200 along a direction of winding SR of the fiber texture 140 produced by three-dimensional weaving, the mandrel having a profile corresponding to that of the casing to be produced.

Advantageously, the fiber preform constitutes a complete tubular fiber reinforcement of the casing 100 forming a single part with an overthickness portion corresponding to the retaining area of the casing.

For this purpose, the mandrel 200 has an outer surface 201 the profile of which corresponds to the inner surface of the casing to be produced. By its winding on the mandrel 200, the fiber texture 140 follows the profile thereof. The mandrel 200 also includes two flanges 220 and 230 to form parts of fiber preform corresponding to the flanges 104 and 105 of the casing 100.

Figure 6:
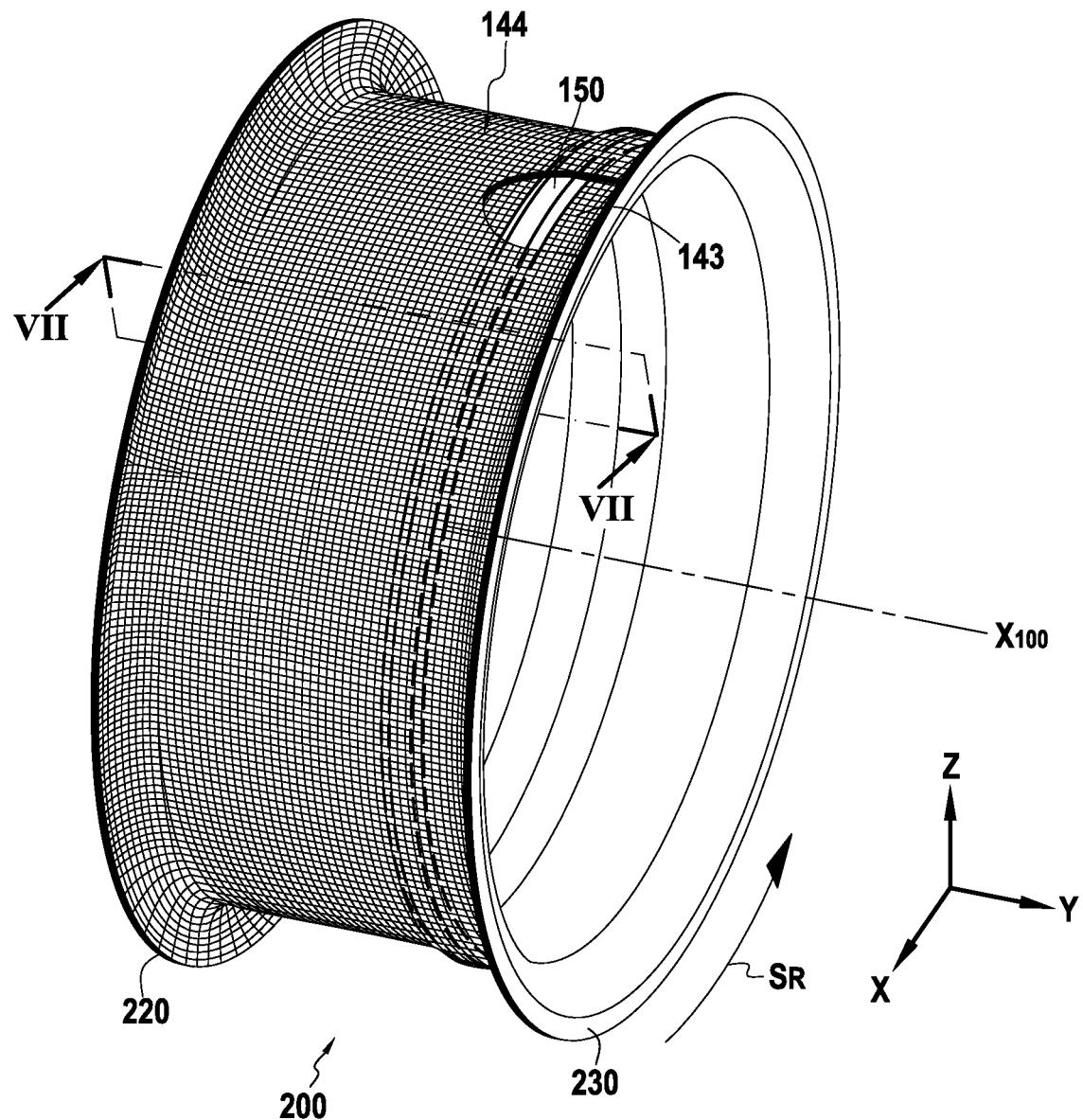
FIG. 6 is a perspective view showing the fiber preform obtained after complete winding of the fiber structure and the stiffening element.

In accordance with the invention, during the winding of the last turn of the fiber texture 140, a stiffening element 150 is inserted into the winding in such a way as to be interposed before the before-last turn and the last turn of the fiber texture as illustrated in FIG. 5. In the example described here, the stiffening element is positioned above the third layer 143 of the texture 140 in such a way as to be covered by the last layer 144 of the fiber texture 140. At the end of the winding, a fiber preform 300 is obtained as shown in FIG. 6.

Figure 7:
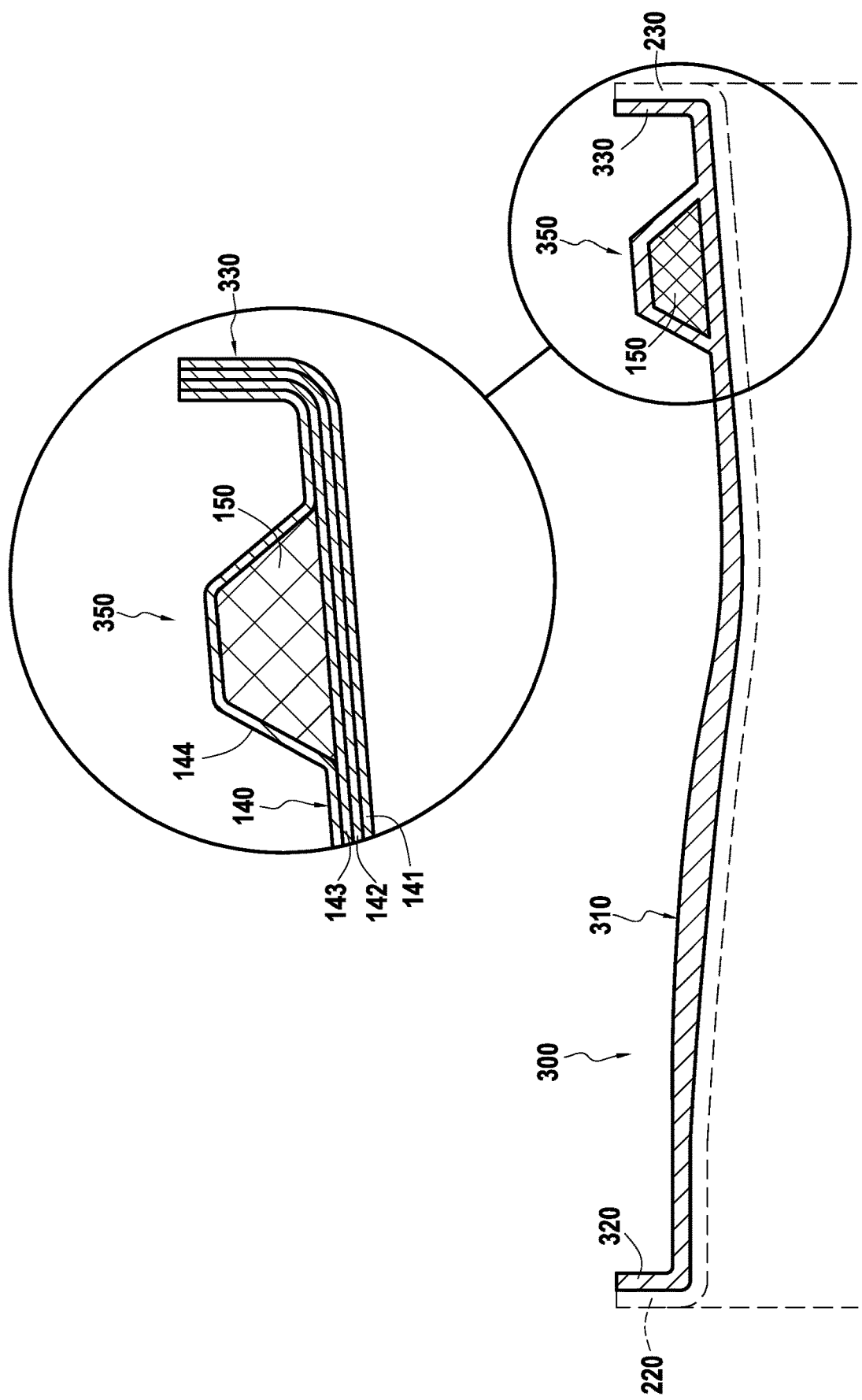
FIG. 7 is a section view showing the profile of the fiber preform of FIG. 6.

FIG. 7 shows a section view of the fiber preform 300 obtained after winding the fiber texture 140 in several layers on the mandrel 200 and interposition of the stiffening element 150 between the before-last layer and the last layer. The number of layers or turns is a function of the desired thickness and the thickness of the fiber texture. It is at least equal to 2. In the example described here, the preform 300 comprises 4 layers 141 to 144 of fiber texture 140 and a stiffening element 150 interposed between the layers 143 and 144 corresponding to the before-last turn and the last turn of the winding respectively.

A fiber preform 300 is obtained with a stiffening portion 350 formed by interposition of the stiffening element between the layers 143 and 144. The fiber preform 300 also comprises an overthickness portion 310 intended to form the retaining area or shield 110 of the casing; the gradual increase/decrease in thickness is obtained by addition/removal of one or more layers of warp and weft threads as described in particular in document EP 1 961 923. The fiber preform 300 again here comprises end parts 320, 330 corresponding to the flanges 104, 105 of the casing.

Next comes the densification of the fiber preform 300 by a matrix.

The densification of the fiber preform consists in filling the porosity of the preform, in all or part of the volume thereof, by the constituent material of the matrix.

The matrix can be obtained in a manner known per se following the liquid process.

Figure 8:
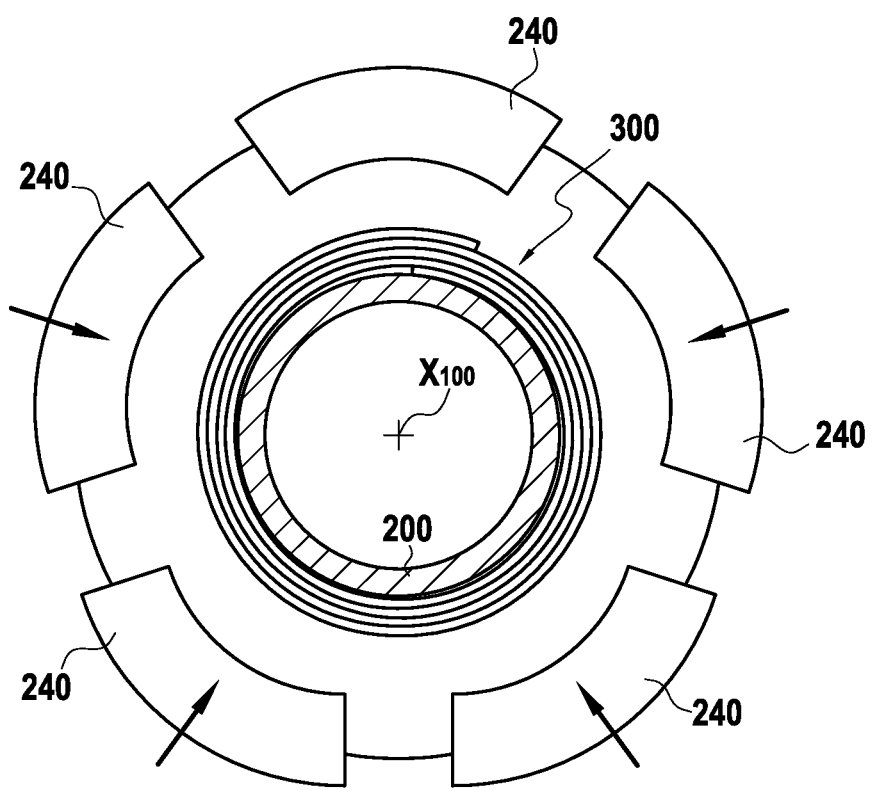
FIG. 8 is a schematic view showing a tooling used to densify the fiber reinforcement of FIG. 6 with a matrix.

The liquid process consists in impregnating the preform with a liquid composition containing an organic precursor of the matrix material. The organic precursor usually takes the form of a polymer, such as a resin, where applicable diluted in solvent. The fiber preform is placed in a mold having the shape of the finished molded part. As illustrated in FIG. 8, the fiber preform 300 is here placed between a plurality of sectors 240 forming a counter-mold and the mandrel 200 forming the support, these elements respectively having the outer and inner shape of the casing to be produced. Next, the liquid matrix precursor is injected, for example a resin, into the whole recess to impregnate the whole fibrous part of the preform. In this case, the aerated material is preferably impermeable to resin in such a way as to avoid weighing down the final part. In the case of a foam, this has closed cells or microbeads. In the case of a cellular structure, the walls of the structure are impermeable to resin.

The transformation of the precursor into an organic matrix, namely its curing, is done by heat treatment, generally by heating of the mold, after eliminating any solvent and curing of the polymer, the preform always being kept in the mold having a shape corresponding to that of the part to be produced. The organic matrix can particularly be obtained from epoxide resins, such as, for example, commercial high-performance epoxide resin, or carbon or ceramic liquid matrix precursors.

In the case of the formation of a carbon or ceramic matrix, the heat treatment consists in pyrolyzing the organic precursor to transform the organic matrix into a carbon or ceramic matrix according to the precursor used and the pyrolysis conditions. By way of example liquid carbon precursors can be resins with a relatively high level of coke, such as phenol resins, whereas ceramic liquid precursors, particularly SiC, can be resins of polycarbosilane (PCS) or polytitanocarbosilane (PTCS) or polysilazane (PSZ) type. Several consecutive cycles, from impregnation to heat treatment, can be carried out to arrive at the desired degree of densification.

According to an aspect of the invention, the densification of the fiber preform can be carried out by the well-known RTM (Resin Transfer Molding) method. In accordance with the RTM process, the fiber preform is placed in a mold having the shape of the casing to be produced. A thermosetting resin is injected into the inner space delimited between the mandrel 200 and the counter-molds 240. A pressure gradient is generally set up in this inner space between the injection site of the resin and the drainage orifices thereof in order to control and optimize the impregnation of the preform by the resin.

The resin used can be, for example, an epoxide resin. The resins suitable for RTM processes are well known. They preferably have low viscosity to facilitate their injection into the fibers. The choice of temperature class and/or chemical nature of the resin is determined according to the thermomechanical stresses to which the part must be subjected. Once the resin is injected into the whole reinforcement, it is cured by heat treatment in accordance with the RTM process.

After the injection and curing, the part is removed from the mold. Finally, the part is trimmed to remove the excess resin and the chamfers are used to obtain the casing 100 illustrated in FIGS. 1 and 2.

In the example described here, the casing 100 comprises a single stiffening element 150 located between the overthickness portion 110 and the downstream flange 105. In another exemplary embodiment, the casing according to the invention can comprise a stiffening element located between the upstream flange 104 and the overthickness portion 110. Still in an exemplary embodiment, the casing according to the invention can comprise a first stiffening element located between the upstream flange 104 and the overthickness portion 110 and a second stiffening element located between the overthickness portion 110 and the downstream flange 105.

Owing to the increase in stiffness provided by the stiffening element or elements incorporated into the fiber reinforcement of the casing, it is possible to reduce the size or tex of the warp threads or strands in the last layer or last turn of the fiber texture at least at the level of the area located above the stiffening element or elements, i.e. the part of the last turn of the fiber texture covering the stiffening element or elements. In FIG. 2, the warp threads or strands present in the fourth and last layer 144 of the fiber texture 140 at the level of an area $Z_R$ can have a size or a tex less than the size or tex of the warp threads of the plurality of layers of warp threads present in the other turns of the fiber texture. For this purpose, it is possible to use warp threads or strands with variable tex, namely threads or strands formed of a separable assembly of single threads each having a determined tex such as those described in particular in document EP 2 791 406. In this case, the size or tex of the warp threads can be reduced when they enter the last winding turn by removing one or more single threads of the variable-tex threads at the level of the concerned area. By way of example, it is possible to have warp threads having a tex of 12K (12 000 fibers) in the last winding turn at the level of the area or areas covering the stiffening element or elements whereas the warp threads in the other winding turns have a tex of 24K (24 000 fibers). This makes it possible to reduce the weight by a factor of 2 in the concerned area while providing an increase in stiffness owing to the stiffening element.

FIGS. 9A and 9B show a composite-material fan casing 400 of the prior art, i.e. without no incorporation of any stiffening element into the fiber reinforcement of the casing. FIG. 9A shows the casing 400 stationary, whereas FIG. 9B shows the deformation of the casing 400 simulated by computation during an excitation of the casing by dynamic stressing of the fan blades in operation. The fan casing 400 has a weight $M_{400}$ and a natural frequency $F_{400}$.

FIGS. 10A and 10B show a composite material fan casing 500 according to the invention, i.e. with incorporation of a stiffening element 550 into the fiber reinforcement of the casing. FIG. 10A shows the casing 500 stationary whereas FIG. 10B shows the deformation of the casing 500 simulated by computation during an excitation of the casing by dynamic stressing of the fan blades in operation. The fan casing 500 has a weight $M_{500}$ less than the weight $M_{400}$ of the casing 400 owing to the incorporation of the stiffening element 550 which is used to thin the casing at the level of the area incorporating the stiffener 550, for example reducing the size or tex of the warp threads in this area and using a cellular structure for the stiffening element as described previously. The computation of the deformation simulation shows that the casing 500 has a natural frequency $F_{500}$ which is higher than the natural frequency $F_{400}$ of the casing 400 of the prior art. Consequently, by incorporating at least one stiffening element into the fiber reinforcement of the casing in accordance with this invention, it is possible to reduce the overall weight of the composite-material casing while increasing the natural frequency thereof, which demonstrates the increase in stiffness provided by the stiffening element.

The invention claimed is:

1. A method for manufacturing a fan casing made of composite material for a gas turbine, comprising:
    producing by three-dimensional weaving between a plurality of layers of warp threads and a plurality of layers of weft threads a fiber texture in the form of a strip,
    winding the fiber texture around several superimposed turns on a mandrel with a profile corresponding to that of the fan casing to be manufactured in order to obtain a fiber preform of a shape corresponding to that of the fan casing to be manufactured, and
    densifying the fiber preform by a matrix,
    wherein the fan casing has a revolution solid shape and is constructed and arranged to surround a fan of the gas turbine,
    wherein, during the winding of the last turn of the fiber texture on the mandrel, at least one stiffening element is interposed between a before-last turn and a last turn of the fiber texture, the stiffening element projecting over the outer surface of the before-last turn of the fiber texture and extending over an entire circumference of said before-last turn, the stiffening element having an axial section of omega-type shape, and
    wherein at least some warp threads of the plurality of layers of warp threads in the last turn of the fiber texture present at the level of an area covering said at least one stiffening element have a size or a tex less than the size or tex of the warp threads of the plurality of layers of warp threads present in the other turns of the fiber texture.

2. The method as claimed in claim 1, wherein each stiffening element comprises two lateral walls projecting over the outer surface of the before-last turn of the fiber texture, each lateral wall forming an angle between 50° and 85° with the axis of the fan casing.

3. The method as claimed in claim 2, wherein the stiffening element is produced from a cellular structure.

4. A gas turbine fan casing made of composite material with a fiber reinforcement comprising a plurality of superimposed turns of a fiber texture in the form of a strip having three-dimensional weaving between a plurality of layers of warp threads and a plurality of layers of weft threads, said fiber reinforcement being densified by a matrix, at least one stiffening element being interposed between a before-last turn and a last turn of the fiber texture, the stiffening element projecting over the outer surface of the before-last turn of the fiber texture and extending over the entire circumference of said before-last turn, the stiffening element having an axial section of omega-type shape,
    wherein the fan casing has a revolution solid shape and is constructed and arranged to surround a fan of a gas turbine, and
    wherein at least some warp threads of the plurality of layers of warp threads in the last turn of the fiber texture present at the level of an area covering said at least one stiffening element have a size or a tex less than the size or tex of the warp threads of the plurality of layers of warp threads present in the other turns of the fiber texture.

5. The gas turbine fan casing as claimed in claim 4, wherein each stiffening element comprises two lateral walls projecting over the outer surface of the before-last turn of the fiber texture, each lateral wall forming an angle between 50° and 85° with the axis of the casing.

6. The gas turbine fan casing as claimed in claim 4, wherein the stiffening element is produced from a cellular structure.

7. An aeronautical gas turbine engine having a fan casing as claimed in claim 4.

8. The gas turbine fan casing as claimed in claim 5, wherein the stiffening element is produced from a cellular structure.

* * * * *